United States Patent [19]

Murphy et al.

[11] Patent Number: 4,890,284
[45] Date of Patent: Dec. 26, 1989

[54] BACKUP CONTROL SYSTEM (BUCS)

[75] Inventors: Richard D. Murphy, Trumbull; William C. Fischer, Monroe, both of Conn.

[73] Assignee: United Technologies Corporation, Hartford, Conn.

[21] Appl. No.: 159,483

[22] Filed: Feb. 22, 1988

[51] Int. Cl.$^4$ ............................................. G06F 11/20
[52] U.S. Cl. ..................................... 371/9.1; 244/194; 364/187
[58] Field of Search .......................... 371/9, 10, 16, 68; 364/184, 187, 431.11, 200 MS File, 900 MS File; 244/194

[56] References Cited

U.S. PATENT DOCUMENTS

| | | | |
|---|---|---|---|
| 4,115,847 | 9/1978 | Osder et al. | 364/187 X |
| 4,141,066 | 2/1979 | Keiles | 364/200 X |
| 4,200,226 | 4/1980 | Piras | 371/9 |
| 4,231,089 | 10/1980 | Lewine et al. | 364/200 |
| 4,371,754 | 2/1983 | De et al. | 371/9 X |
| 4,437,154 | 3/1984 | Eisele et al. | 364/187 |
| 4,532,594 | 7/1985 | Hosaka et al. | 364/431.11 |
| 4,542,479 | 9/1985 | Kamimura et al. | 364/900 |
| 4,590,549 | 5/1986 | Burrage et al. | 364/184 X |

FOREIGN PATENT DOCUMENTS

| | | |
|---|---|---|
| 0096510 | 12/1983 | European Pat. Off. . |
| 0211500 | 2/1987 | European Pat. Off. . |
| 1560554 | 2/1980 | United Kingdom . |
| 2104247 | 6/1985 | United Kingdom . |

OTHER PUBLICATIONS

NASA Position Paper, Back-Up Flight Control For Flight Crucial Digital Fly-By-Wire Systems, Sep. 10, 1982.
Dual Dissimilar Microprocessors Give Fail-Safe Aircraft Control, Control Engineering, Sep. 1982, p. 74.
Snyder, Modular Fault Tolerance Keeps Computer Systems Reliable, Electronic Design, vol. 29, No. 10, May 14, 1981, pp. 163–167.
"Fault Tolerance by Design Diversity: Concepts and Experiments", Algirdas Avizienis and John P. J. Kelly, Computer, Aug. 1984, pp. 67–80.

Primary Examiner—Charles E. Atkinson
Attorney, Agent, or Firm—Francis J. Maguire, Jr.

[57] ABSTRACT

A backup software program is installed in an isolated portion in the memory of at least one of redundant computers. The backup program performs basically the same functions as the prime program but is dissimilarly programmed to prevent a common software error. Switchover to the backup program occurs either automatically in response to monitors, or manually by the operator (i.e. pilot) when he detects an anomaly.

10 Claims, 2 Drawing Sheets

BACKUP CONTROL SYSTEM (BUCS)

The invention described herein was made in the performance of work under NASA Contract No. NAS2-11771 and is subject to the provisions of Section 305 of the National Aeronautics and Space Act of 1958 (72 Stat. 435; 42 U.S.C. 2457). S-3777

CROSS REFERENCE TO RELATED APPLICATION

The invention described herein may employ some of the teachings disclosed and claimed in a commonly owned co-pending application filed on Oct. 24, 1986 by Tulpule et al, Ser. No. 922,617, entitled A RELIABLE, INDEPENDENT, BACKUP MODE TRANSFER MECHANISM FOR DIGITAL CONTROL COMPUTERS.

TECHNICAL FIELD

The invention relates to techniques for responding to software errors, especially in life critical systems such as aircraft control.

BACKGROUND OF THE INVENTION

Continued proper operation of a digital system following a software fault is highly desirable in modern computer systems and becomes mandatory in a life critical digital system, such as those employed in aircraft primary flight control systems. A software error may manifest itself by the processor becoming mired within the program and not completing its tasks, or by the processor completing its tasks too rapidly by not executing all of its program. Redundant hardware and voting schemes provide hardware fault protection but do not provide safeguards against software faults when the redundant computers are programmed with identical software. Thus, each of the redundant channels can suffer the same software fault, at virtually the same instant. The present state of the art in software verification and validation does not provide any tool or technique which can guarantee the absence of software faults; on the contrary, experience has shown that software errors continue to exist even in exhaustively verified and validated software.

Backup systems have been provided by simple analog systems, additional digital systems which are dissimilarly programmed, or by mechanical means. Reversion to these backups generally occurs following disagreement between the redundant channels of the prime digital system. These backup systems require significant additional hardware with the attendant disadvantages of cost, weight, power demand and heat dissipation. The analog and mechanical backups are additionally constrained to be simple derivatives of the usually highly complex and nonlinear implementation of the prime digital system.

DISCLOSURE OF THE INVENTION

It is an object of the invention to provide a means of continuing the proper operation of a digital computer system in the presence of a software error with minimal additional hardware.

According to the invention, a backup software program is installed in an isolated portion in the memory of at least one of the redundant computers. The second program performs basically the same functions as the prime program but is dissimilarly programmed to avoid a common software error. Switchover to the second program occurs either automatically, or manually by the operator (i.e. pilot) when he detects an anomaly. Automatic switchover is initiated when at least n-1 (in a system having n levels of redundancy) computer monitors indicate a software fault condition. The computer monitors may be duty cycle timers which detect a computer cycling improperly (too long or too short), reasonableness testers, analog comparision models, or a combination of these types. Complexity and sophistication of the monitors will vary for particular applications but, in general, the monitors must be implemented in hardware to preclude their being rendered ineffective by the common software faults they are intended to discover. The assembler or compiler used to assemble/compile the backup mode program is also dissimilarly programmed to eliminate possible assembler/compiler faults as a source of common mode software faults.

Other objects, features, and advantages of the invention will become more apparent in light of the following description thereof.

BEST MODE FOR CARRYING OUT THE INVENTION

Figure 1:
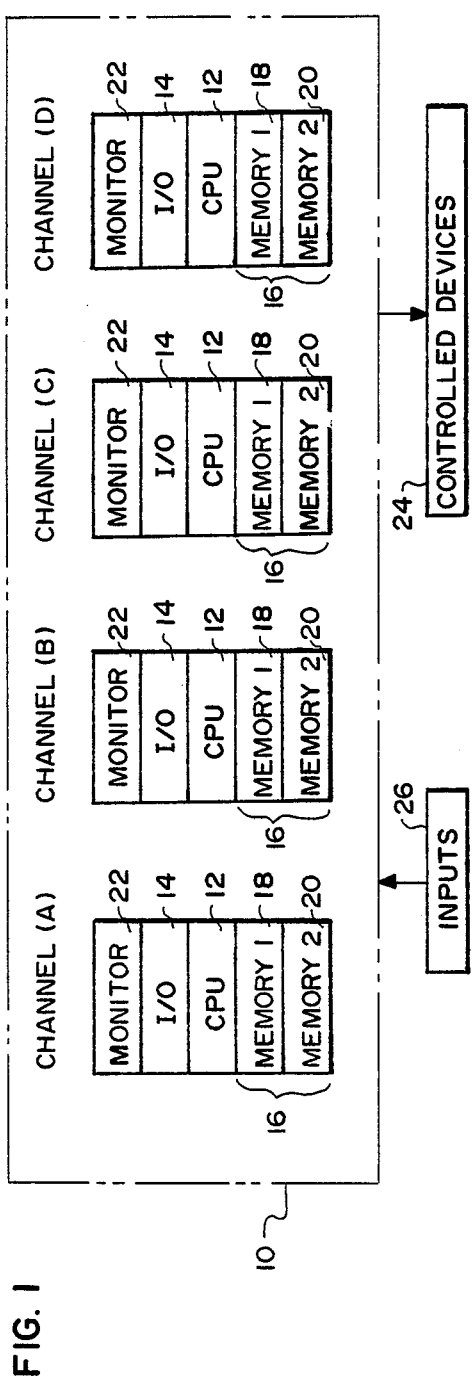
FIG. 1 is a block diagram of a control system employing the invention.

In FIG. 1 is shown a computer based control system (10) having four computer channels A-D. Each channel has a processor section 12, associated input/output hardware 14, and memory 16. The memory 16 is divided into two portions. A portion 18 contains primary software which is accessed during normal system operation. A portion 20 contains dissimilar backup software, and is accessed only upon failure of the primary software. A monitor 22, is operable to determine failure of the primary software. The monitor 22 is, for example, a duty cycle timer, reasonableness tester, or analog comparison model.

The four channels A-D are redundant; that is, each contains copies of the primary and backup software in their respective memories 16. The computer system 10 implements a voting scheme in either hardware or software, such as is known, to output the most appropriate selected signal to a controlled device 24, such as the control surface actuators of an aircraft, in response to inputs 26, such as signals from a pilot or sensors. It should be understood that the invention is applicable to any number of channels, and that the backup software could be installed in only one channel.

Figure 2:
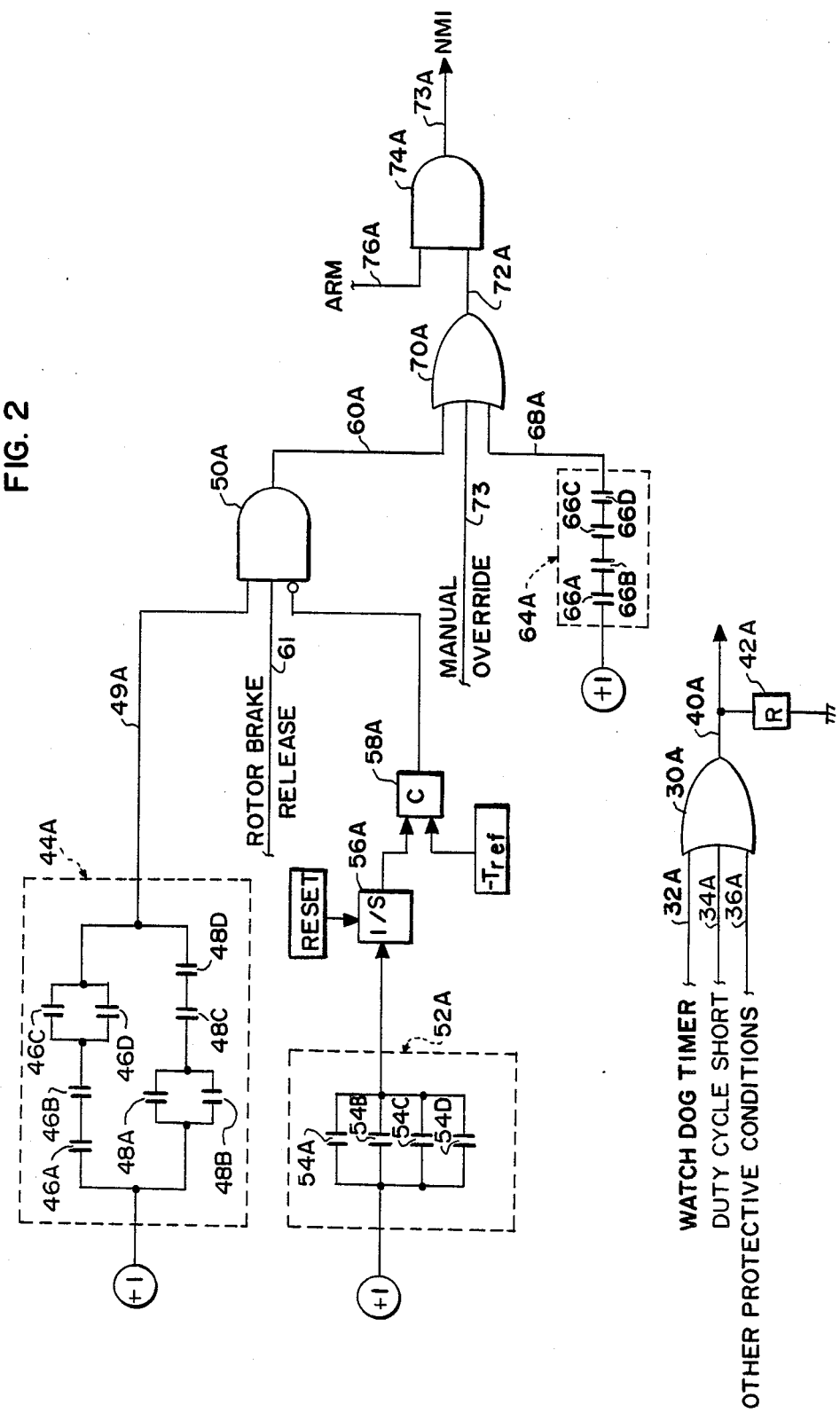
FIG. 2 is a schematic of a monitor for the invention.

FIG. 2 details a typical monitor 22 used in each channel of the computer system 10, for instance the channel A, which is representative of the monitors 22 in channels B, C, and D. An OR gate 30A (the "A" suffix indicates association with channel A) is responsive to signals from a watchdog timer 32A, a short duty cycle timer 34A, and a signal on a line 36A, indicative of other protective conditions; any of which will cause the OR gate 30A to provide a signal on a line 40A that will shut down the power to channel A. A relay 42A for the channel A trips in response to the signal on the line 40A to shut down the channel A. Similar OR gates 30B–30D and relays 42B–42D are provided for the other channels B–D. The switching logic for the monitors 22 should be implemented in hardware so that they are independent of software faults.

A switching section 44A includes two contact sets 46A–46D, 48A–48D from each relay 42A–42D, arranged as shown so that any three channel failures will generate a signal on a line 49A to an AND circuit 50A.

Another switching section 52A includes a third contact set 54A–54D from each relay 42A–42D arranged in parallel so that the failure of any one channel starts a timer, such as an integrator 56A driving a comparator 58A, so that until a predetermined interval of time ($T_{ref}$) has elapsed, indicative of the time within which a common mode software failure would be experienced in all channels, an enable signal is provided to the AND circuit 50A. (The timer 56A may be reset for conditions such as rotor brake "ON".) If it is judged that a common mode failure is not a near simultaneous event, then $T_{ref}$ can be set to infinity. This will permit the backup software to be engaged whenever n−1 out of n severs occur.

The AND circuit 50A is only responsive to the signals from the switching section 44A and the comparator 58A to provide a signal on a line 60 when the flight critical system is active (such as might be sensed by a rotor brake release signal in a helicopter embodiment) as indicated by a signal on a line 61 (common to all channels A–D).

A switching section 64A includes a contact set 66A–66D from each relay 42A–42D arranged in series so that a signal is output on a line 68A in response to a software failure in all four channels A–D.

An OR gate 70A is responsive to the output of the AND gate 50A and to the output of the switching section 64A to provide a signal on a line 72A which will initiate the backup mode of operation based on either contingency. The signal on the line 72A is also provided in response to a manual override signal on a line 73 to the OR gate 70A.

The signal on the line 72A will proceed to the channel A as a nonmaskable hardware interrupt signal on a line 73A if an AND circuit 74A is armed by an arming signal on a line 76A to its input. The nonmaskable hardware interrupt request is issued to each channel A–D, whereupon the CPU 12 will complete whatever instruction it is currently executing before acknowledging the nonmaskable interrupt. The hardware transfer logic will respond to the nonmaskable interrupt by switching to the backup memory bank. The CPU will then begin "servicing the interrupt" at the prescribed memory location in the backup memory. The interrupt service routine in this case will actually be the backup software. This switchover logic accomplishes a unified switchover of the processor at a known processor state and to a known location in the backup memory. It is necessary that the backup system reinitialize the system, for instance by reinitializing. Suspect fault conditions could also be reset, since they could be faulty indications of the malfunctionary software. It is also desirable to synchronize the commands computed to actuator positions (in an aircraft) to minimize transients, and then blend over a period of time to the backup memory commands.

In a system such as an aircraft control system, the backup software can be a simplified control law. Generally, the simpler the control law is, the easier it is to verify and validate. The backup software can be installed in all of the computers, but it may be preferable to install it in only one, thereby avoiding voting schemes and other complications in the event of switchover to the backup software.

The backup system requires limited additional input/output interfaces, digital logic circuitry, and new software for each channel that it is installed in.

When the pilot arms the Backup Mode (76A), the FCS (Flight Control System) will continue to operate in the normal mode until any one or more of the following conditions occur:

1. The pilot initiates a backup transfer.
2. n−1 control system channels output "sever" within the prescribed time interval $T_{ref}$.
3. n control system channels output sever.

The Backup mode transfer logic selects from the aforementioned condition list any active requesting condition signal to drive a nonmaskable interrupt request to the processor(s) in the channel. The reaction to the nonmaskable interrupt can be thought of as causing a jam transfer to the backup memory for instructions. The same transfer process will be separately occurring in the other channels.

Figure 3:
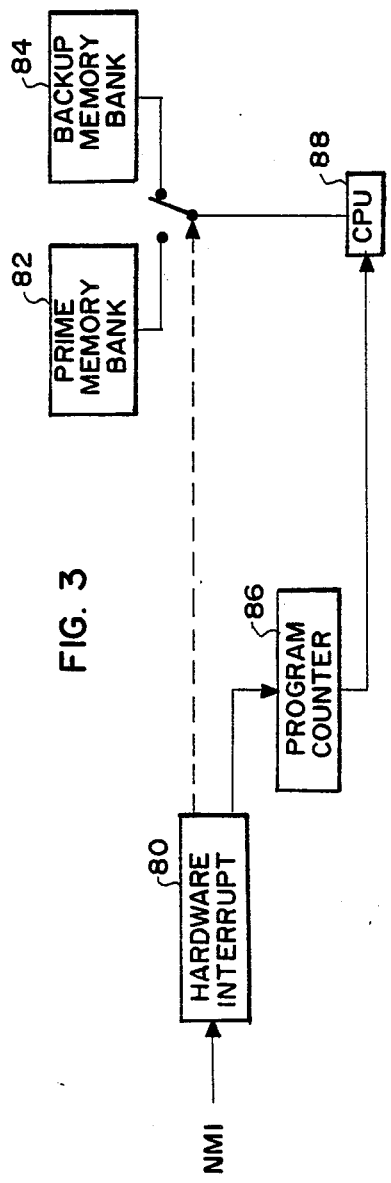
FIG. 3 is a block diagram detailing a portion of the invention

With reference to FIG. 3, each channel will respond to the NMI via a hardware interrupt 80 which will cause the following sequential actions to occur:

1. The memory bank will be switched from the prime memory bank 82 to the backup memory bank 84;
2. The proper starting address of the backup software (residing in the backup memory bank) will be transferred into program counter 86; and
3. The CPU 88 will execute its next instruction from the starting address of the backup program now stored in the program counter.

We claim:

1. In a computer system (10) having a plurality of identical processors (12) and controlling a device (24), a method of providing control over the device comprising:

installing identical primary software in a portion (18) of memory (16) associated with each processor (12), said primary software directing the operation of the processors to control the device during normal operation;

installing backup software, dissimilar from the primary software, in an isolated portion (20) of memory (16) associated with at least one of the processors (12), said backup software capable of directing the operation of the processor(s) to control the device of in the event of a sensed event;

sensing for a fault event occurring in the primary software affecting all processors;

sensing for a fault event occurring in the primary software affecting a majority of the processors (12);

sensing for an externally initiated event represented by a backup software transfer command signal;

providing a nonmaskable interrupt request in response to one of said sensed events;

completing whatever instruction is being executed in the primary software when the nonmaskable interrupt request is provided, and then acknowledging the nonmaskable interrupt request; and disabling the primary software and executing the backup software in response to the nonmaskable interrupt request so as to maintain control over the device with the backup software associated with the at least one processor.

2. A method according to claim 1, comprising jam-transferring to the isolated portion of memory in response to the sensed fault.

3. A method according to claim 1 wherein the backup software is simpler than the primary software.

4. In a computer system (10) having at least two identical processors (12) and controlling a device (24), a method of providing control over the device comprising:

installing identical primary software in a portion (18) of memory (16) associated with each processor (12), said primary software directing the operation of the processors to control the device during normal operation;

installing backup software, dissimilar from the primary software, in an isolated portion (20) of memory (16) associated with at least one of the processors (12), said backup software capable of directing the operation of the processor(s) to control the device in the event of a sensed fault in the primary software affecting all processors;

enabling a nonmaskable interrupt request circuit;

sensing the fault in the primary software affecting all processors;

providing a nonmaskable interrupt request in response to the sensed fault;

completing whatever instruction is being executed in the primary software when the nonmaskable interrupt request is provided, and then acknowledging the nonmaskable interrupt request; and disabling the primary software and executing the backup software in response to the nonmaskable interrupt request so as to maintain control over the device with the backup software associated with the at least one processor.

5. In a computer system (10) having a plurality of identical processors (12) and controlling a device (24), a method of providing control over the device comprising:

installing identical primary software in a portion (18) of memory (16) associated with each processor (12), said primary software directing the operation of the processors to control the device during normal operation:

installing backup software, dissimilar from the primary software, in an isolated portion (20) of memory (16) associated with at least one of the processors (12), said backup software capable of directing the operation of the processors(s) to control the device in the event of a sensed fault in the primary software affecting a majority of the processors;

sensing a first to occur fault in the primary software affecting any one or more of the processors;

providing a transfer enable signal for a selected period after sensing said fault in said one or more of the processors;

sensing said fault in the primary software affecting a majority of the processors and providing a transfer signal for so long as said fault persists;

providing a nonmaskable interrupt request in response to the sensed fault only if said transfer signal occurs concurrently with said enable signal;

completing whatever instruction is being executed in the primary software when the nonmaskable interrupt request is provided, and then acknowledging the nonmaskable interrupt request; and disabling the primary software and executing the backup software in response to the nonmaskable interrupt request so as to maintain control over the device with the backup software associated with the at least one processor.

6. A method of providing control over a device (24) by means of a computer system (10) having a plurality of identical processors (12), comprising the steps of:

installing identical primary software in a portion (18) of memory (16) associated with each processor (12), said primary software in each channel's memory (18) for directing the operating of its associated processor to control the device;

installing backup software, dissimilar from said primary software, in a portion (20) of said memory (16) in at least one of the processors (12), said backup software protected by hardware (80) from access by said primary software, said backup software for directing the operation of the processor(s) to control the device (24) in the event of a sensed fault in said primary software affecting the processors;

sensing, by means of a window timer, a fault in said primary software affecting the processors (12) and providing a fault signal indicative thereof; and disabling, in response to said fault signal, said primary software and activating said backup software so as to maintain control over the device (24) with said backup software.

7. A method of providing control over a device (24) by means of a computer system (10) having a plurality of identical processors (12), comprising the steps of:

installing identical primary software in a portion (18) of memory (16) associated with each processor (12), said primary software in each channel's memory (18) for directing the operating of its associated processor to control the device;

installing backup software, dissimilar from said primary software, in a portion (20) of said memory (16) in at least one of the processors (12), said backup software protected by hardware (80) from access by said primary software, said backup software for directing the operation of the processor(s) to control the device (24) in the event of a sensed fault in said primary software affecting the processors;

sensing, by means of hardware (22), for a fault event occurring in the primary software affecting a majority of the processors (12) and sensing for an externally initiated event represented by a backup software transfer command signal and providing said fault signal in response to one of said sensed events; and disabling in response to said fault signal, said primary software and activating said backup software so as to maintain control over the device (24) with said backup software.

8. A method of providing control over a device (24) by means of a computer system (10) having a plurality of identical processors (12), comprising the steps of:

installing identical primary software in a portion (18) of memory (16) associated with each processor (12), said primary software in each channel's memory (18) for directing the operating of its associated processor to control the device;

installing backup software, dissimilar from said primary software, in a portion (20) of said memory (16) in at least one of the processors (12), said backup software protected by hardware (80) from access by said primary software, said backup software for directing the operation of the processor(s) to control the device (24) in the event of a sensed fault in said primary software affecting the processors;

sensing by means of hardware (22), a fault in said primary software affecting the processors (12) and providing a fault signal in the form of a nonmaskable interrupt signal in response to the sensing of said fault in said primary software affecting the processors and wherein said step of disabling comprises the step of jam transferring to said backup software in response to said nonmaskable interrupt signal; and disabling, in response to said fault signal, said primary software and activating said backup software so as to maintain control over the device (24) with said backup software.

9. A method of providing control over a device (24) by means of a computer system (10) having a plurality of identical processors (12), comprising the steps of:

installing identical primary software in a portion (18) of memory (16) associated with each processor (12), said primary software in each channel's memory (18) for directing the operating of its associated processor to control the device;

installing backup software, dissimilar from said primary software, in a portion (20) of said memory (16) in at least one of the processors (12), said backup software protected by hardware (80) from access by said primary software, said backup software for directing the operation of the processor(s) to control the device (24) in the event of a sensed fault in said primary software affecting the processors;

sensing, by means of hardware (22), a first to occur fault in the primary software affecting any one or more of the processors (12) and providing a transfer enable signal for a selected period after sensing said first fault event and providing a transfer request in response to n-1 fault event if said n−1 fault event; and disabling, in response to said fault signal, said primary software and activating said backup software so as to maintain control over the device (24) with said backup software.

10. A method of providing control over a device (24) by means of a computer system (10) having a plurality of identical processors (12), comprising the steps of:

installing identical primary software in a portion (18) of memory (16) associated with each processor (12), said primary software in each channel's memory (18) for directing the operating of its associated processor to control the device;

installing backup software, dissimilar from said primary software, in a portion (20) of said memory (16) in at least one of the processors (12), said backup software protected by hardware (80) from access by said primary software, said backup software for directing the operation of the processor(s) to control the device (24) in the event of a sensed fault in said primary software affecting the processors;

sensing, by means of hardware (22) a fault in said primary software affecting the processors (12) and providing a fault signal indicative thereof; and disabling, in response to said fault signal, said primary software and activating said backup software so as to maintain control over the device (24) with said backup software;

wherein said backup software (20) in each channel are operated synchronously and said device (24) is controlled by means of synchronized command signals to control transients.

* * * * *